US009296091B2

(12) United States Patent
Wang et al.

(10) Patent No.: US 9,296,091 B2
(45) Date of Patent: Mar. 29, 2016

(54) JIG FOR SECURING THIMBLE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Yao-Huan Wang, Shenzhen (CN); Zi-Mo Zhao, Shenzhen (CN); Jian Yang, Shenzhen (CN); Zhong-Xian Xu, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 157 days.

(21) Appl. No.: 14/254,027
(22) Filed: Apr. 16, 2014

(65) Prior Publication Data

US 2014/0353897 A1 Dec. 4, 2014

(30) Foreign Application Priority Data

Jun. 3, 2013 (CN) ........................ 2013 1 02153825

(51) Int. Cl.
*B23Q 3/02* (2006.01)
*B25B 5/00* (2006.01)
*B25B 5/08* (2006.01)

(52) U.S. Cl.
CPC .. *B25B 5/003* (2013.01); *B25B 5/08* (2013.01)

(58) Field of Classification Search
USPC .......................................................... 269/92
See application file for complete search history.

(56) References Cited

U.S. PATENT DOCUMENTS 4,324,048 A * 4/1982 Frost .................. B23K 37/0435 269/249
4,641,821 A * 2/1987 Jaworski ................... B25B 5/08 269/157
4,805,888 A * 2/1989 Bishop ................. B23Q 1/5468 269/235
4,903,929 A * 2/1990 Hoffman ................. B25B 5/003 24/335
5,330,167 A * 7/1994 Plumb ........................ B25B 1/06 269/153
5,718,422 A * 2/1998 Morghen ................. B23Q 3/18 269/138
5,735,513 A * 4/1998 Toffolon .................... B25B 1/08 269/138
6,276,038 B1 * 8/2001 Boochakorn ............. B25B 5/08 29/281.5
2003/0150970 A1 * 8/2003 Kuo ........................ B25B 5/003 248/346.03
2003/0151185 A1 * 8/2003 Feyter ....................... B25B 5/10 269/138
2004/0007803 A1 * 1/2004 Wong ....................... B25B 5/003 269/41
2011/0024962 A1 * 2/2011 Zhang ........................ B25B 5/06 269/107
2012/0068394 A1 * 3/2012 Baker ...................... B25B 1/103 269/45

(Continued)

FOREIGN PATENT DOCUMENTS

DE 1603999 A1 * 5/1971 .............. B25B 5/003

*Primary Examiner* — Lee D Wilson
*Assistant Examiner* — Alvin Grant
(74) *Attorney, Agent, or Firm* — Novak Druce Connolly Bove + Quigg LLP

(57) ABSTRACT

A jig for securing a thimble, includes a securing block, a pressing plate, a locking assembly. The securing block defines a step hole and a cutout. The pressing plate presses the thimble in the receiving slot. The pressing plate defines an avoiding hole. A pair of short sides and a pair of long sides bound the avoiding hole. The locking assembly includes a pole and an adjusting nut. The pole is inserted in the step hole and the avoiding hole. The adjusting nut includes a pair of long edges and a pair of short edges. The adjusting nut rotates on the pole to align the long edge with the short side to have the adjusting nut press the pressing plate, and rotate on the pole aligning the long edge to the long side locating the adjusting nut in the avoiding hole.

17 Claims, 7 Drawing Sheets

(56) References Cited

U.S. PATENT DOCUMENTS

2013/0062879 A1* 3/2013 Wang .................. F16L 27/0816
285/347

2013/0341848 A1* 12/2013 Woods .................... B25B 11/02
269/37

* cited by examiner

JIG FOR SECURING THIMBLE

CROSS-REFERENCE TO RELATED APPLICATIONS

This application claims all benefits accruing under 35 U.S.C. §119 from China Patent Application No. 201310215382.5, filed on Jun. 3, 2013 in the China Intellectual Property Office. The contents of the China Application are hereby incorporated by reference.

FIELD

The disclosure generally relates to jigs, and especially to a jig for securing thimbles.

BACKGROUND

The thimble needs to be secured firmly when being machined. However, different thimbles of different scales often need to be secured by different jigs. It is often inconvenient to secure many thimbles on different jugs.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
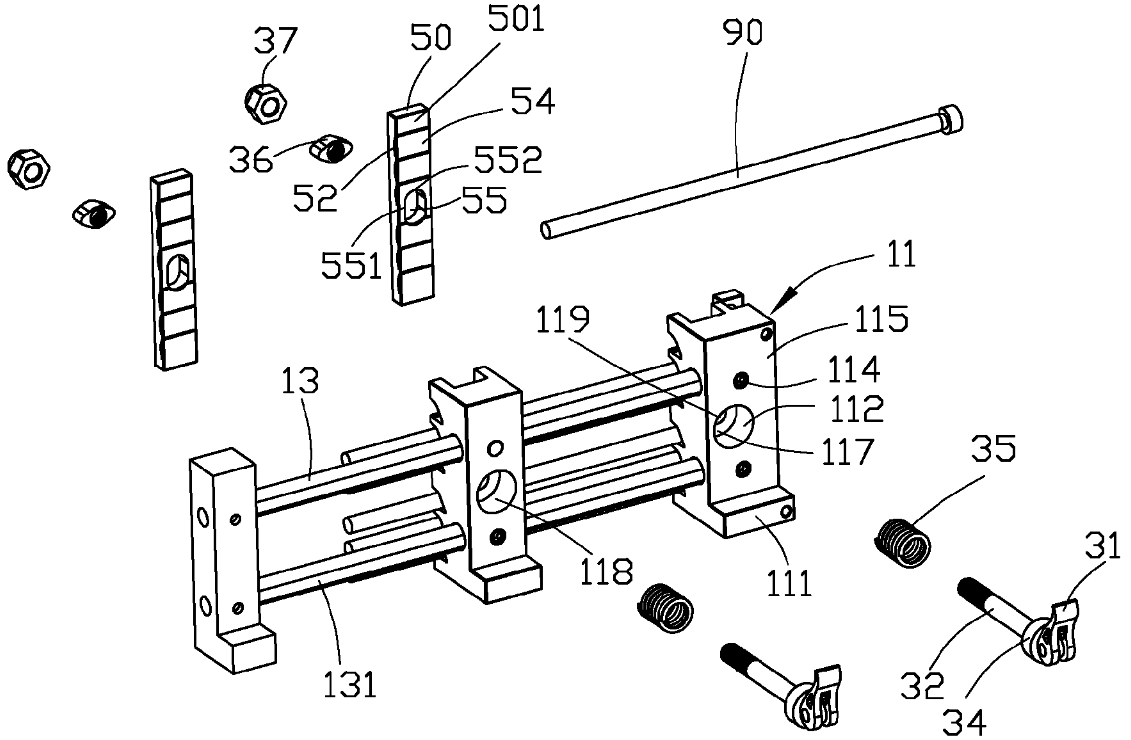
FIG. 1 is an isometric, exploded view of an embodiment of a jig for securing thimbles.
Figure 2:
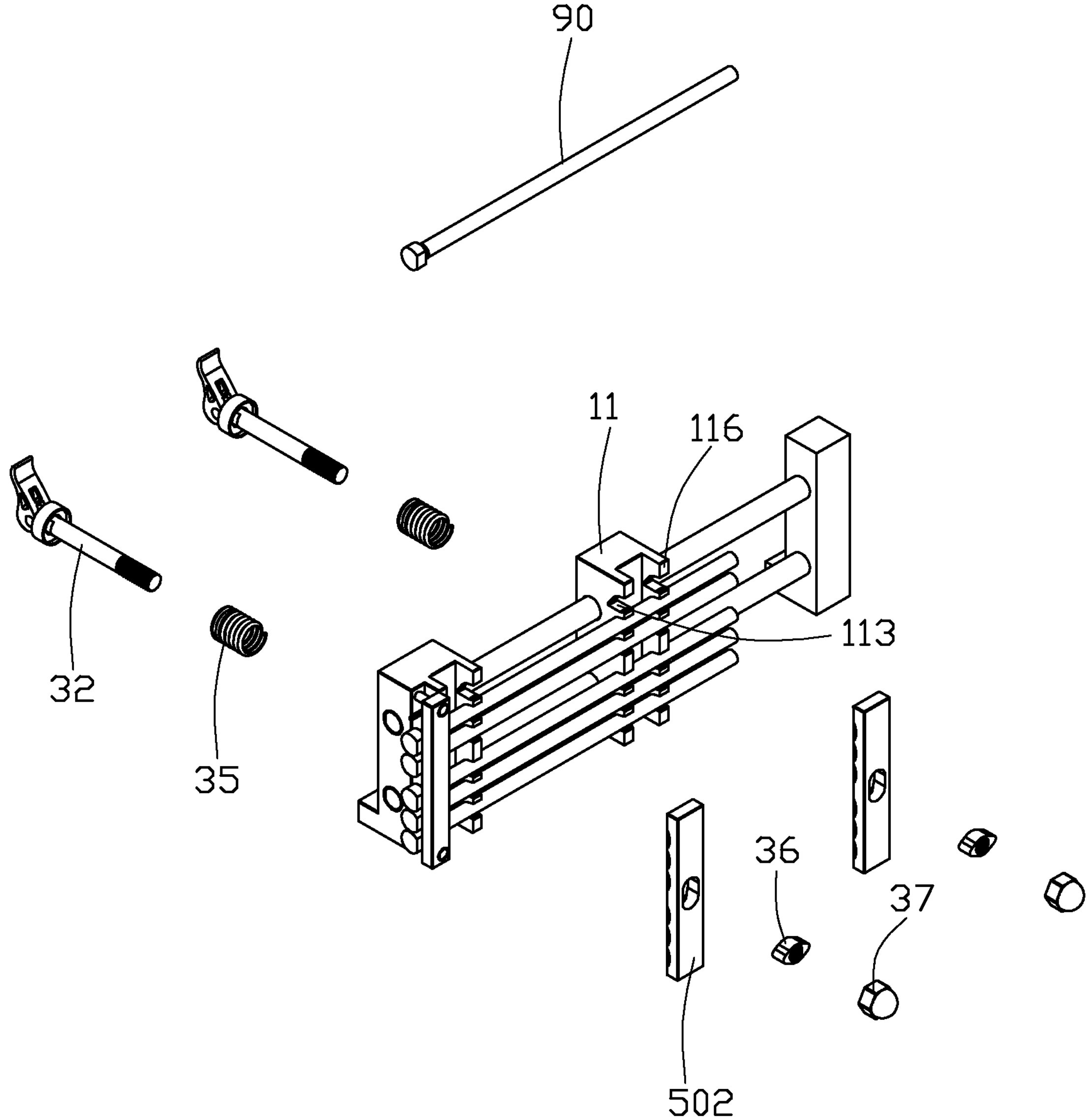
FIG. 2 is similar to FIG. 1, but viewed from another aspect.

FIGS. 1 and 2 illustrate one embodiment of a jig for securing thimbles. The jig includes a base, a plurality of locking assemblies, and a plurality of pressing plates 50.

The base includes a plurality of securing blocks 11 and a plurality of guiding posts 13. The plurality of guiding posts 13 are inserted in the plurality of securing blocks 11. The plurality of blocks 11 can slide on the plurality of guiding posts 13. One side of the guiding post 13 is cut off to define a reference plane 131.

The securing block 11 can be mounted on a bench. The securing block 11 includes a first side 115 and a second side 116 opposite to the first side 115. A step hole 117 is defined between the first side 115 and the second side 116. The step hole 117 includes a first hole 118 adjacent to the first side 115 and a second hole 119 adjacent to the second side 116. A step portion 117 is formed between the first hole 118 and the second hole 119. A diameter of the first hole 118 is larger than that of the second hole 119. A positioning bolt 114 is secured in the securing block 11 corresponding to each guiding post 13. The positioning bolt 114 can be driven to press the reference plane 131 of the guiding post 13 to secure the securing block 11 on the guiding post 13.

The second side 116 defines a plurality of receiving slots 113. Each receiving slot 113 is formed in a "V" shape to receive different thimbles of different scales.

Figure 3:
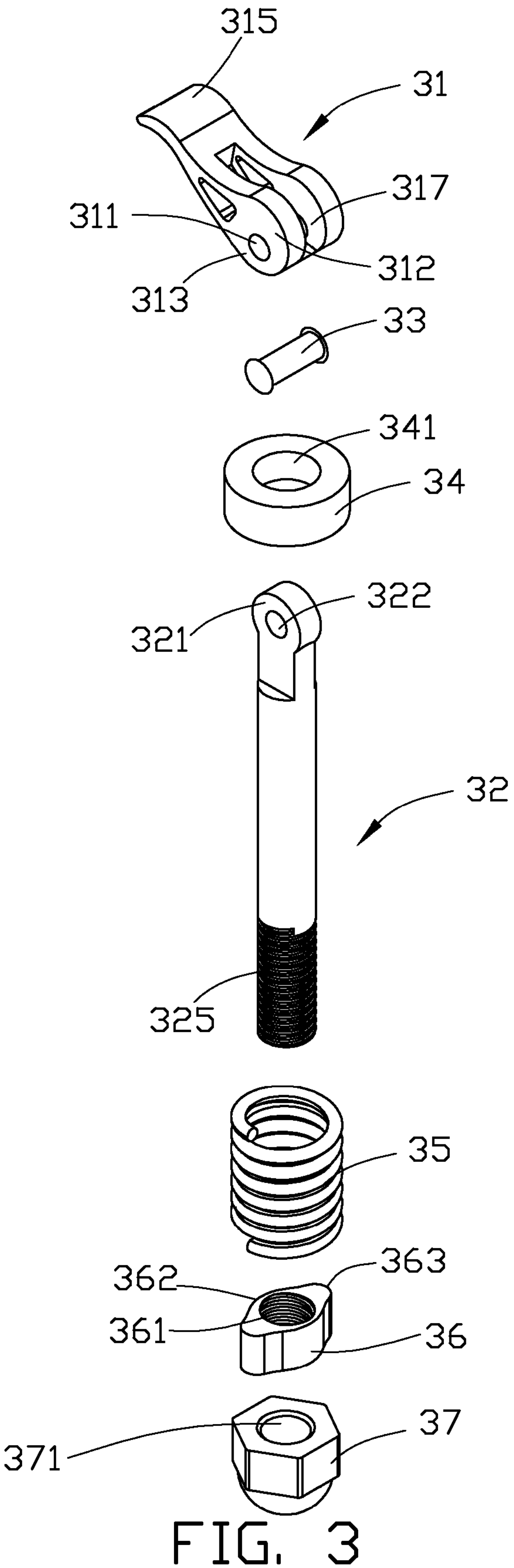
FIG. 3 is an isometric, exploded view of a locking assembly of the jig of FIG. 1.
Figure 4:
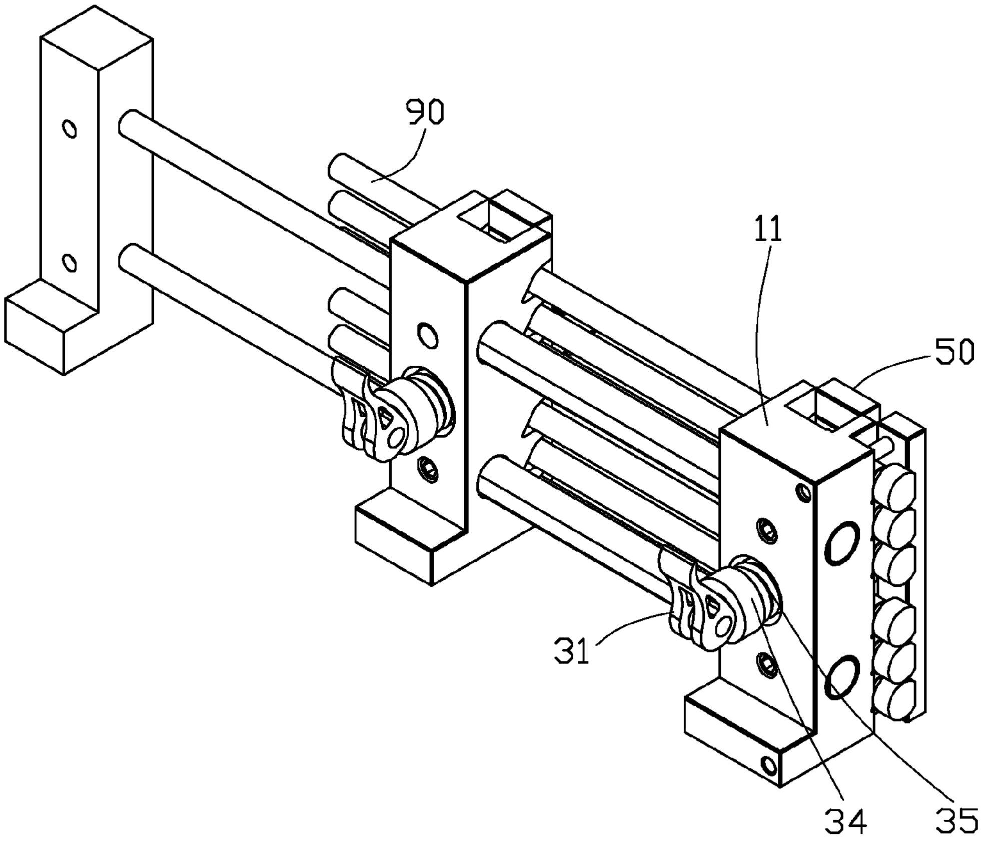
FIG. 4 is an isometric, assembled view of the jig of FIG. 1.
Figure 5:
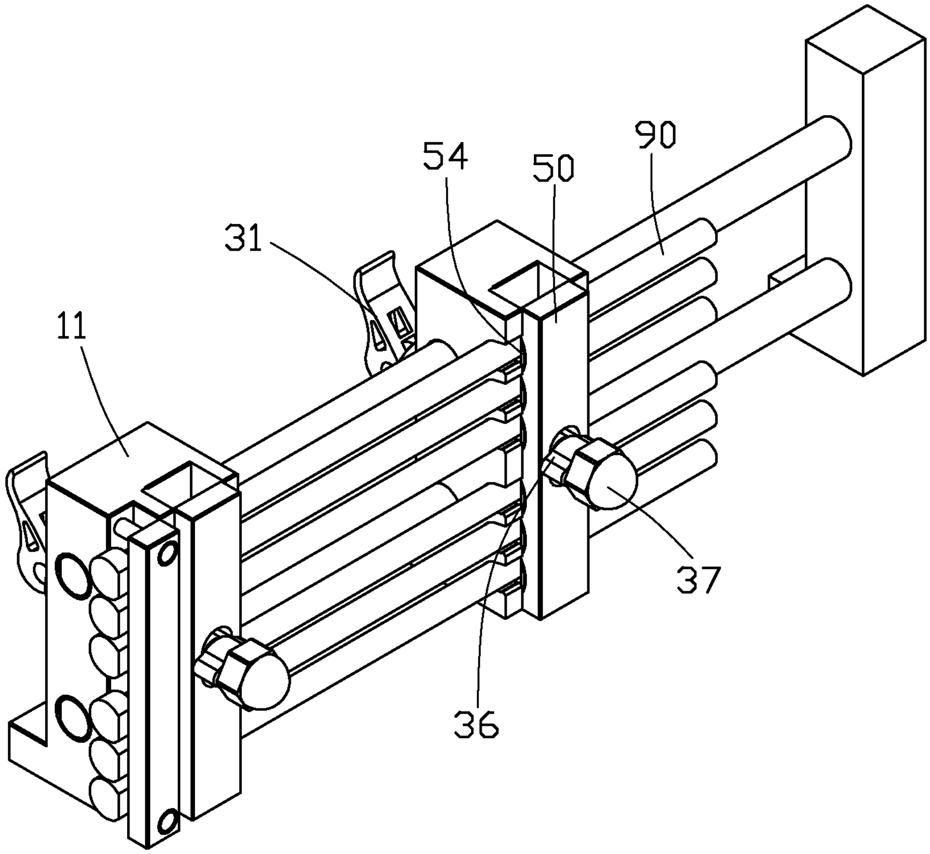
FIG. 5 is similar to FIG. 4, but viewed from another aspect.
Figure 6:
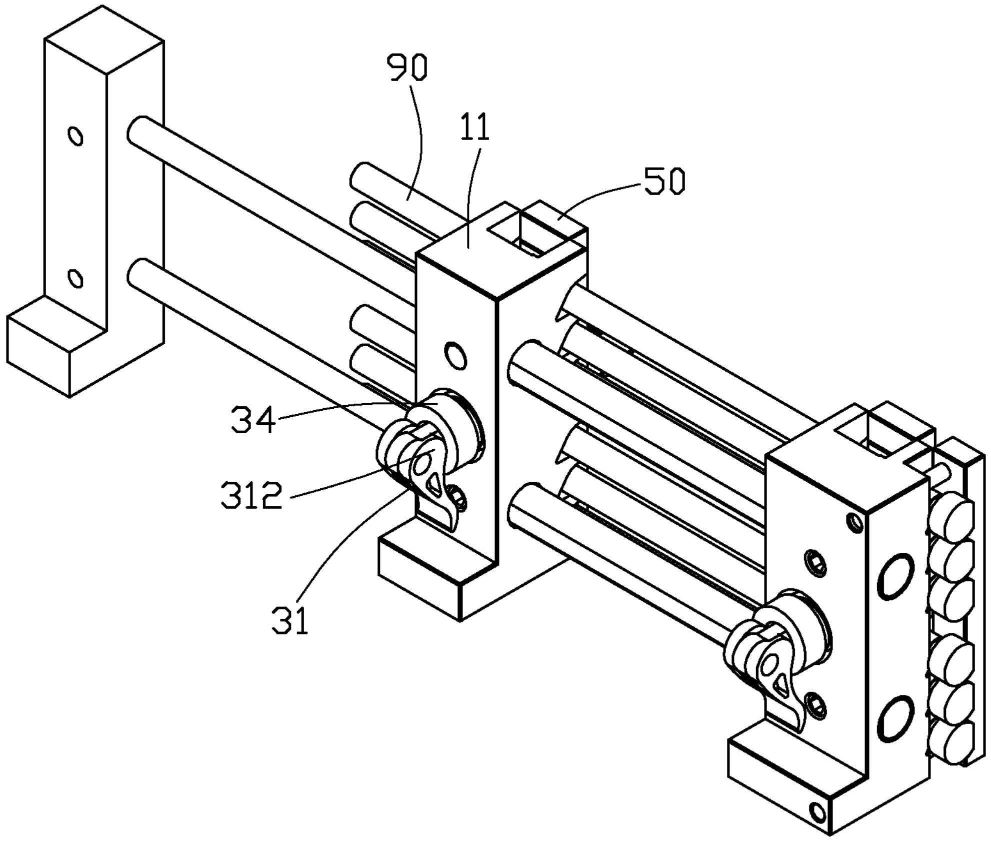
FIG. 6 is another isometric, assembled view of the jig of FIG. 1 to illustrate the thimbles are secured.
Figure 7:
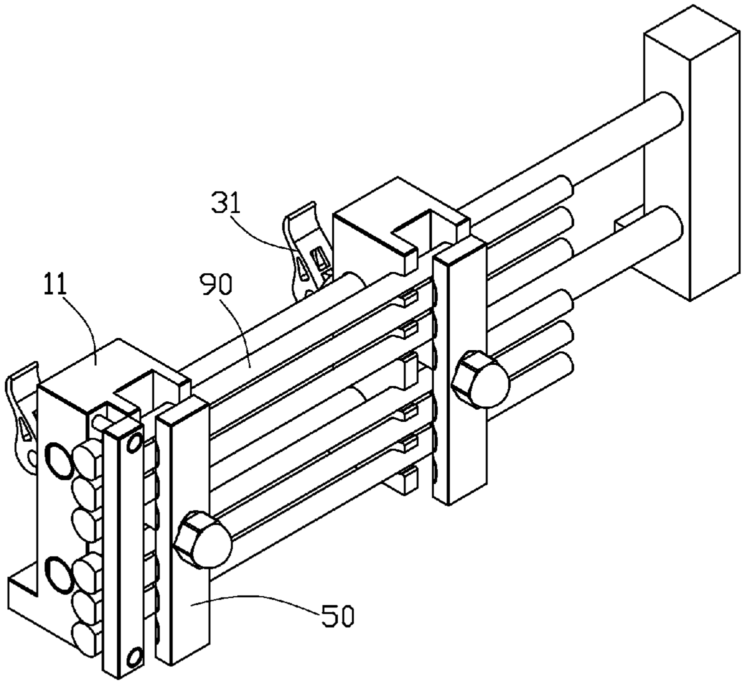
FIG. 7 is another isometric, assembled view of the jig of FIG. 1 to illustrate the thimbles are released.

FIG. 3 illustrates that the locking assembly includes a locking member 31, a pole 32, a shaft 33, a sleeve 34, a spring 35, and a restricting nut 37. The locking member 31 defines a cutout 317 and a pivot hole 311 extending through the locking member 31. The cutout 317 and the pivot hole 311 extend in perpendicular directions. The locking member 31 includes a wide portion 312 and a narrow portion 313. The wide portion 312 and the narrow portion 313 are located on opposite sides of the pivot hole 311. A width of the wide portion 312 is larger than that of the narrow portion 313. The locking member 31 includes an operation portion 315.

The pole 32 includes a flat mounting portion 321 on one end. The mounting portion 321 defines a through hole 322. A plurality of screw threads 325 is formed on another end of the pole 32. A diameter of the pole 32 is smaller than that of the second hole 119 of the step hole 112.

The sleeve 34 defines a receiving hole 341. The pole 32 can be inserted in the receiving hole 341. A diameter of the sleeve 34 is larger than that of the first hole 118.

The spring 35 can be located on the pole 32. A diameter of the spring 35 is smaller than that of the first hole 118 and larger than that of the first hole 119.

The adjusting nut 36 defines a first screw hole 361. The first screw hole 361 extends through the adjusting nut 36. The screw threads 325 of the pole 32 can engage with the first screw hole 361. The adjusting nut 36 includes a pair of long edges 362 and a pair of short edges 363.

The restricting nut 37 includes a second screw hole 371. The second screw hole 371 does not extend through the restricting nut 37.

FIG. 1 illustrates that the pressing plate 50 includes a pressing side 501, which faces to the second side 116 of the securing block 11. The pressing side 501 defines a plurality of curve cutouts 52 to form a plurality of elastic pieces 54. Each elastic piece 54 corresponds to a receiving slot 113. The pressing plate 50 defines an avoiding hole 55. A pair of long sides 551 and a pair of short sides 552 bounds the avoiding hole 55. A length of the long side 551 is larger than that of the long edge 362 of the adjusting nut 36. A length of the short side 552 is smaller than that of long edge 362 and larger that of the short edge 363. The avoiding hole 55 is aligned to the step hole 112.

FIGS. 4 to 7 illustrate that in assembly, the mounting portion 321 of the pole 32 is inserted in the cutout 317 to align the through hole 322 with the pivot hole 311. The shaft 33 is inserted in the through hole 322 and the pivot hole 311 to pivotally mount the locking member 31 on the pole 32. Then, the pole 32 is inserted in the receiving hole 341 of the sleeve 34. The narrow portion 313 abuts one side of the sleeve 34. One end of the spring 35 is located on the pole 32 and abuts another side of the sleeve 34. The pole 32 is further inserted in the step hole 112. Another end of the spring 35 is received in the first hole 118 and abuts the step portion 117. The screw thread 325 of the pole 32 is inserted through the second hole 119.

The thimble 90 is located in the receiving slot 113 of the securing block 11. The elastic pieces 54 press on the thimble 90. The screw thread 325 is inserted through avoiding hole 55 and screwed in the first screw hole 361 and the second screw hole 371. Thereby, the adjusting nut 36 and the restricting nut 37 are mounted on the pole 32. The long edges 362 of the adjusting nut 36 align to the short sides 552 of the avoiding hole 55. The adjusting nut 36 presses the pressing plate 50. The operation portion 315 is pulled to rotate the locking member 31. The wide portion 312 then presses the sleeve 34 to further compress the spring 35 (shown in FIG. 6). Therefore, the elastic pieces 54 is elastically deformed to apply a force on the thimble 90 to secure the thimble 90 in the receiving slot 113. Because the elastic piece 54 is elastically deformed, the thimble 90 can be protected from being crushed.

To detach the thimble 90, the operation portion 315 is pulled to rotate the locking member 31. The narrow portion 313 presses the sleeve 34. The spring 35 is released. Then, the adjusting nut 36 rotates to align the long edges 362 with the long side 551. The adjusting nut 36 is moved in the avoiding hole 55. The adjusting nut 36 does not press the pressing plate 50 (shown in FIG. 7). The pressing plate 50 is then moved away from the securing block 11. Then, the thimble 90 is detached.

In the above jig, several thimbles 90 can be secured in the receiving slots 113 at one time. Further, because the receiving slot 113 is defined in a "V" shape, different thimbles 90 of different scales can be received in the receiving slot 113.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A jig for securing a thimble, comprising:

at least one securing block comprising a first side and a second side opposite to the first side, the second side defining a receiving slot, the at least one securing block defining a step hole between the first side and the second side, a step portion formed in the step hole;

a locking assembly comprising a locking member, a pole, a spring, and a sleeve, the locking member pivotally mounted on one end of the pole, the sleeve located on the pole and abutting the locking member, the spring located on the pole and one end of the spring abutting the sleeve, the locking member comprising a wide portion and a narrow portion, a width of the wide portion being larger than that of the narrow portion, the pole inserted in the step hole from the first side of the at least one securing block with another end of the spring abutting the step portion;

a pressing plate pressing the thimble in the receiving slot; and an adjusting nut movably mounted on the pole to press the pressing plate;

wherein the locking member is configured to rotate on the pole between a first position and a second position; at the first position, the wide portion of the locking member abuts the sleeve to compress the spring; and at the second position, the narrow portion of the locking member abuts the sleeve to release the spring.

2. The jig of claim 1, wherein the pressing plate defines an avoiding hole, a pair of short sides and a pair of long sides bounds the avoiding hole, the adjusting nut comprises a pair of long edges and a pair of short edges, a length of the long side is larger than that of the long edge, a length of the short side is larger than that of the short edge and smaller than that of the long edge, and the pair of long edges of the adjusting nut are aligned to the pair of short sides of the avoiding hole to have the adjusting nut press the pressing plate.

3. The jig of claim 2, wherein the adjusting nut is configured to rotate to align the pair of long edges of the adjusting nut to the pair of long sides of the avoiding hole to locate the adjusting nut in the avoiding hole.

4. The jig of claim 1, wherein the pressing plate comprises a pressing side, the pressing side defines a cutout to form an elastic piece, and the elastic piece presses on the thimble.

5. The jig of claim 4, wherein the cutout is curved.

6. The jig of claim 1, wherein the at least one securing block comprises two securing blocks, a guiding post is connected between the two securing bocks, and the two securing blocks are configured to slide on the guiding post to adjust a distance between the two securing blocks.

7. The jig of claim 6, wherein one side of the guiding post is cut off to define a reference plane.

8. The jig of claim 7, wherein a positioning bolt is secured in the at least one securing block, and the positioning bolt is driven to press the reference plane to secure the at least one securing block on the guiding post.

9. The jig of claim 1, wherein the receiving slot is formed in a "V" shape.

10. A jig for securing a thimble, comprising:

at least one securing block defining a step hole and a cutout for receiving the thimble;

a pressing plate pressing the thimble in the receiving slot, the pressing plate defining an avoiding hole, a pair of short sides and a pair of long sides bounding the avoiding hole;

a locking assembly comprising a pole and an adjusting nut, the pole inserted in the step hole and the avoiding hole, the adjusting nut comprising a pair of long edges and a pair of short edges, the adjusting nut movably mounted on the pole to abut the pressing plate, a length of the long side is larger than that of the long edge, a length of the short side is larger than that of the short edge and smaller than that of the long edge;

wherein the adjusting nut is configured to rotate on the pole to align the long edge with the short side to have the adjusting nut press the pressing plate, and rotate on the pole to align the pair of long edges of the adjusting nut to the pair of long sides of the avoiding hole to locate the adjusting nut in the avoiding hole.

11. The jig of claim 10, wherein the locking assembly comprises a locking member, a spring, and a sleeve, the locking member is pivotally mounted on one end of the pole, the sleeve is located on the pole and abuts the locking member, the spring is located on the pole and one end of the spring abuts the sleeve, the locking member comprises a wide portion and a narrow portion, a width of the wide portion is larger than that of the narrow portion, another end of the spring abuts the step portion, the locking member is configured to rotate on the pole between a first position and a second position; at the first position, the wide portion of the locking member abuts the sleeve to compress the spring; and at the second position, the narrow portion of the locking member abuts the sleeve to release the spring.

12. The jig of claim 10, wherein the pressing plate comprises a pressing side, the pressing side defines a cutout to form an elastic piece, and the elastic piece presses on the thimble.

13. The jig of claim 12, wherein the cutout is curved.

14. The jig of claim 10, wherein the at least one securing block comprise two securing blocks, a guiding post is connected between the two securing bocks, and the two securing blocks are configured to slide on the guiding post to adjust a distance between the two securing blocks.

15. The jig of claim 14, wherein one side of the guiding post is cut off to define a reference plane.

16. The jig of claim 15, wherein a positioning bolt is secured in the at least one securing block, and the positioning bolt is driven to press the reference plane to secure the at least one securing block on the guiding post.

17. The jig of claim 10, wherein the receiving slot is formed in a "V" shape.

* * * * *